US008135612B1

(12) United States Patent
Scudder

(10) Patent No.: US 8,135,612 B1
(45) Date of Patent: Mar. 13, 2012

(54) AUTOMATED HELP TICKET ASSIGNMENT SYSTEM

(75) Inventor: Jeffrey W. Scudder, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 198 days.

(21) Appl. No.: 12/347,687

(22) Filed: Dec. 31, 2008

(51) Int. Cl.
*G06B 19/418* (2006.01)

(52) U.S. Cl. .............. 705/8; 705/5; 705/64; 705/69; 705/37; 709/222; 709/217

(58) Field of Classification Search ............ 705/5, 8, 705/64, 69, 37; 709/217
See application file for complete search history.

(56) References Cited

U.S. PATENT DOCUMENTS

| | | | | |
|---|---|---|---|---|
| 6,260,027 B1* | 7/2001 | Takahashi et al. | ............... | 705/69 |
| 6,926,203 B1* | 8/2005 | Sehr | ............... | 235/492 |
| 7,117,504 B2* | 10/2006 | Smith et al. | ............... | 719/328 |
| 2002/0046076 A1* | 4/2002 | Baillargeon et al. | ............... | 705/8 |
| 2002/0065759 A1* | 5/2002 | Boies et al. | ............... | 705/37 |
| 2005/0125274 A1* | 6/2005 | Nastacio et al. | ............... | 705/8 |
| 2008/0133283 A1* | 6/2008 | Backer et al. | ............... | 705/5 |
| 2008/0255889 A1* | 10/2008 | Geisler et al. | ............... | 705/5 |

OTHER PUBLICATIONS

Shao et al., "EasyTicket: A Ticket Routing Recommendation Engine for Enterprise Problem Resolution," *VLDB '08*, Aug. 24-30, 2008; 4 pages.
Web Help Desk, "Auto Route and Assign Tickets: Maximize the Power of the Web Help Desk Software with Dynamic Routing and Assignment of Service Requests," published in 2008, downloaded from http://www.webhelpdesk.com/help-desk-software/eDocs/WHD-auto-route-assign-tickets.pdf on Apr. 14, 2009; 7 pages.
Wikipedia, "Comparison of Issue Tracking Systems," published on Mar. 12, 2009, downloaded from http://en.wikipedia.org/w/index.php?title=Comparison_of_issue_tracking_systems&oldid=276750186 on Apr. 14, 2009; 11 pages.

* cited by examiner

*Primary Examiner* — Vanel Frenel
(74) *Attorney, Agent, or Firm* — Sterne, Kessler, Goldstein & Fox P.L.L.C.

(57) ABSTRACT

Embodiments of the present invention relate to systems and methods for automating the assignment of digital help-desk requests. An embodiment of the invention includes a request analyzer module which analyzes the content of the digital help-desk request, a task load monitor module which analyzes the help-desk resource availability and suitability, and a help-ticket assignment module with generates a help ticket based on the digital help-desk request and assigns the help ticket to a resource based upon the analysis of the request and the analysis of resource availability and suitability. The system may also estimate a time to respond to the request based upon an analysis of the assigned resources capabilities and status.

22 Claims, 2 Drawing Sheets

AUTOMATED HELP TICKET ASSIGNMENT SYSTEM

BACKGROUND

1. Field of the Invention

Embodiments of the present invention relate to assignment of call tickets within a help-desk system.

2. Related Art

A typical help desk provides a central point for users seeking assistance regarding a certain software or hardware product. The help desk will usually employ some type of incident or call tracking software into which the help desk team can input a description of the issue and track that issue until it is ultimately resolved. Once an issue is identified a call ticket is typically generated. The call ticket is a record of the issue and contains appropriate related and relevant information. A call ticket can take the form of a physical piece of paper or, more commonly, an electronic record.

Some of the larger or more complex help-desk implementations assign a person to manage, the call tickets, commonly called a queue manager or queue supervisor. The queue manager typically assigns a ticket to an individual based on an arbitrary perceived skillset of the resource and the type of issue involved. In an automated call ticket system, a computer routes the next incident or call to the next available help-desk resource, without regard to that resource's level of expertise, history of performance, or outstanding priority incidents of the help-desk resource.

In other help-desk scenarios, the help-desk resources are responsible for picking which incidents they wish to support. This type of approach tends to lead to a "cherry picking" approach of resolving the quick and easy issues, while ignoring the more complex, time consuming problems.

BRIEF SUMMARY

An embodiment of the present invention includes a help ticket assignment module, a request analyzer module, and a task load monitor module. The help ticket assignment module receives a digital help request from a user. The request analyzer module, through the use of a request parser, analyzes that digital help request to identify certain characteristics of the request. The task load monitor module is responsible for analyzing the suitability and availability of the help-desk resources. The help ticket assignment module generates a help ticket from the digital help request and assigns the help ticket to the most appropriate help-desk resource based on the characteristics of the request in conjunction with the suitability and availability of the resources.

In an embodiment, the digital help request is parsed to identify at least one of: the identity of the user, the topic of the request, the relevancy of the request, the urgency of the request, and the priority of the request.

In an embodiment, the topic is determined by analyzing a set of attributes for each possible topic utilizing a parser on the help-desk digital request. The attributes may include, for example, and without limitation, a keyword in the request, a distribution analysis of the identified keywords, the appearance of a common phrase, and/or whether the topic is of a previous digital help request submitted by the same user.

In an embodiment, the task load monitor module further includes a resource analyzer and a resource database to determine and analyze the availability and suitability of a help-desk resource for a particular help ticket generated from a digital help request.

In an embodiment, the suitability of a help-desk resource is determined based on the amount of time the help-desk resource took to respond to a previous help ticket and/or based on a measure of quality of a previous response of the help-desk resource.

In an embodiment, the availability of a help-desk resource is determined based on a number of factors including workload level, state of instant messaging status, volume of unanswered electronic mail, quantity of outstanding assigned tickets, vacation responder status, status of an outstanding issue, status of an unresolved issue, severity of the outstanding and unresolved issues, and a priority of the outstanding and unresolved issues.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

Figure 1:
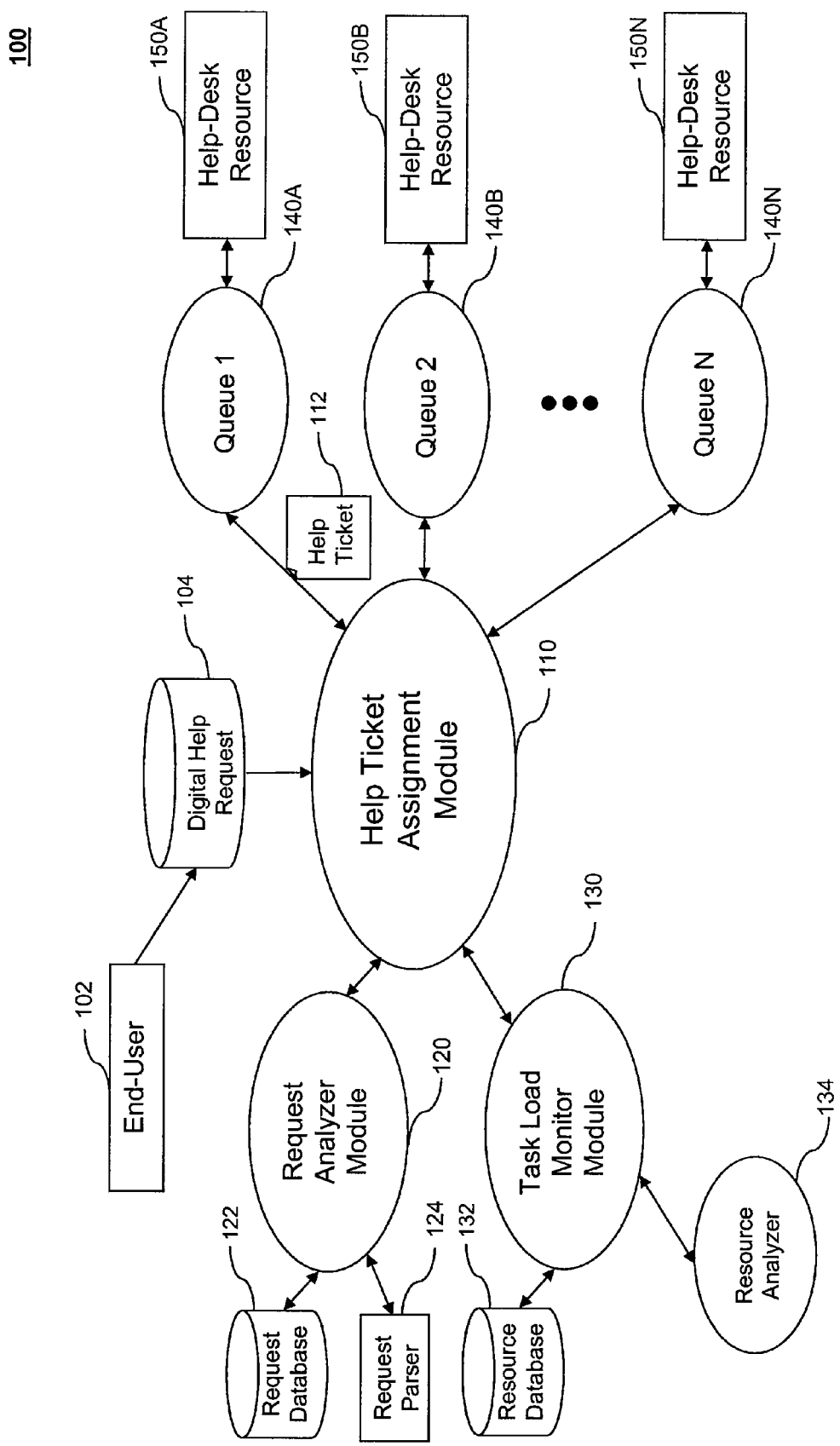
FIG. 1 is a system diagram depicting an implementation of a system for the automatic assignment of help tickets, according to an embodiment of the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Embodiments of the present invention relate to the receipt of a digital help request from a user, an analysis of the request, and the generation and assignment of a help ticket to a help-desk resource based on the suitability and availability of the help-desk resource. In embodiments of this invention, the submitted digital help request is analyzed for a number of characteristics including the most probable topic to associate with the request. In addition, numerous factors of the help-desk resources are analyzed to determine the suitability and availability of those help-desk resources so that the help ticket can be assigned to the most appropriate help-desk resource.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that embodiments of this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 is an illustration of a system 100, according to an embodiment of the invention. Such a system allows for the receipt and analysis of a digital help request from an end-user, generation of a help ticket based on the submitted digital help request, and the assignment of the help ticket to a help-desk resource based upon the analysis of the task load monitor module. The task load monitor module utilizes a resource analyzer to determine the suitability and availability of a help-desk resource for any given digital help request. System 100 contains a help ticket assignment module 110, a request analyzer module 120, and a task load monitor module 130. Request analyzer module 120 utilizes request parser 124 in conjunction with request database 122 to analyze an incoming digital help request 104 from end-user 102. Task load monitor module 130 utilizes resource analyzer 134 and resource database 132 to analyze help-desk resources 150. Help-desk resources 150 are illustrated as multiple help-desk resource elements 150A through 150N and may include any number of resources, groups of resources, or the like. Throughout this application help-desk resources 150A through 150N may be collectively referred to as help-desk resources 150 without the implication of any limitation or restriction. Help ticket assignment module 110 generates and assigns a help ticket 112 to an appropriate help-desk resource 150 based on the analysis of both request analyzer module 120 and task load monitor module 130. Each of these components will be described in further detail below.

The process starts when end-user 102 has a question, problem, or concern about which the end-user 102 feels the need to contact a help-desk for assistance. End-user 102 submits a digital help request 104 which may include any type of digital communication including, but not limited to, e-mail, a digitally encoded worksheet, a scanned help request form, a digitally recorded voice message, or the like. Once digital help request 104 is received by help ticket assignment module 110, digital help request 104 is transferred to request analyzer module 120. In an embodiment, request analyzer module 120 stores digital help request 104 in request database 122 that may be used in subsequent digital help requests. Request analyzer module 120 determines the characteristics associated with digital help request 104. Such characteristics may include, for example and without limitation, information such as the identity of a user, a topic associated with help request 104, the relevancy of help-request 104, the urgency of help-request 104, and the priority associated with help-request 104. These characteristics are used by help ticket assignment module 110 in generating and determining the appropriateness of the resulting help ticket 112 to a particular assignment queue 140 of a help-desk resource 150. In an embodiment, the request analyzer may be configured to assign a high, or alternatively a low, priority to a request which is deemed to be an inappropriate fit for the skill set of available help-desk resources 150. For example, if the associated topic of a digital help-desk request 104 pertains to subject matter that has nothing in common with the expertise of the help-desk resources, e.g. a cooking question submitted to a word processing software help center, then request analyzer module 120 may generate a topic characteristic that places a lower priority for responding to digital-help request 104. Alternatively, the topic characteristic may place a high priority on the digital help request 104 to respond to end-user 102 that this help center may not be able to assist with the submitted digital help request 104. In the same manner, if digital help request 104 contains matter that is highly relevant, with a high urgency or priority, then these characteristics may be communicated to help ticket assignment module 110 to obtain an appropriately high level of response from an appropriate help-desk resource 150, e.g. a more skilled resource rather than a novice resource.

The characteristics associated with digital help request 104 are generated using request parser 124. Request parser 124 takes as input digital help request 104. Through word recognition, character recognition, speech recognition, and/or other recognition and artificial intelligence methods known to those skilled in the art, request parser 124 parses the information contained within digital help request 104. Request parser 124 captures the hierarchy of digital information contained within digital help request 104 and transforms it into a form suitable for further processing, including storage within request database 122. The information within request database 122 is used to prioritize the request as well as to identify topics within the request.

Request parser 124 is also responsible for determining a likelihood that digital help request 104 is inappropriate. An inappropriate request may include, for example, spam, untargeted email, bulk email, and the like. An digital help request 104 that is determined to be inappropriate by request parser 124 will be identified as such and may be assigned to one or more special queues 140, which may be processed in an automated fashion.

In another embodiment, digital help request 104 may contain one or more topics, for example, multiple issues requiring different levels of expertise in order to properly respond. Request parser 124 generates a set of topic attributes associated with each topic in digital help request 104. Such topic attributes may include, for example and without limitation, a particular keyword, the distribution of keywords within digital help request 104, the appearance of a common phrase, and/or a topic from a previous digital help request submitted by end-user 102 that is stored within request database 122. Request parser 124 generates a topic score associated with each possible topic that is identified in digital help request 104. For example, a digital help request may generate a set of three possible topics with a possible likelihood of 85% for the first topic, 70% for the second topic, and 15% for the third topic. In this manner, request analyzer module 120 determines a ranking of the topics associated with digital help request 104.

In an embodiment, task loader module 130 is responsible for analyzing and monitoring help-desk resources 150. Task loader module 130 is configured to determine the availability and suitability of each individual help-desk resource 150 for a help ticket 112 based on submitted digital help request 104. This is accomplished through the use of resource analyzer 134 and resource database 132. Resource database 132 stores information associated with each help-desk resource 150, including historical information such as the amount of time in which the help-desk resource 150 took to respond to a previous digital help request 104 and a measure of the quality of a previous response of the help-desk resource 150 to a digital help request 104. Through the analysis of this information, resource analyzer 134 can determine the suitability of help-desk resource 150 for a particular help ticket 112 based on digital help request 104. A higher suitability of help-desk resource 150 for a particular help ticket 112 indicates a higher likelihood of a timely and successful resolution of digital help request. As an example, if a specific help-desk resource "A" has successfully responded to "technology X" issues in a timely fashion for the past 5 years, the suitability of help-desk resource "A" to a new "technology X" matter would be higher than help-desk resource "B" who may have never handled a "technology X" matter. Suitability may be a considered a measurement of the expertise of a specific help-desk resource 150 to a particular topic.

In an embodiment, resource analyzer module 120 determines the availability of help-desk resource 150 through the analysis of a number of factors which resource analyzer module 134 collects and stores in resource database 132. Factors of help-desk resource 150 that resource analyzer 134 considers include workload level, instant messaging status, volume of unanswered electronic mail, quantity of outstanding assigned tickets, vacation responder, status of an outstanding issue, status of an unresolved issue, severity of the outstanding and unresolved issues, and priority of the outstanding and unresolved issues. As an example, the higher the workload level of a resource the less likely an additional help ticket 112 would be assigned to that help-desk resource. As another example, the state of instant messaging status may also be a determining factor. For example, if the chat status is "away" or "busy" then assignment of an additional help ticket 112 based on digital help request 104 is less likely than if the status is one of "idle" or "available." As another example, if the volume of unanswered electronic mail is large, that factor tends to indicate that the help-desk resource 150 is not as available for another help ticket 112 than another help-desk resource 150 with a low amount of unanswered electronic mail. In the same manner as the electronic mail example, if a help-desk resource 150 has a large quantity of outstanding assigned tickets, then that factor indicates that help-desk resource 150 is not as available as perhaps a different help-desk resource 150.

Other examples of factors relating to availability include whether a help-desk resource 150 has an email indicator showing that the resource is on vacation. In such a circumstance, the assignment of a new help ticket 112 to that help-desk resource 150 may not be as likely compared to a different help-desk resource 150 that gave no indication of being on vacation. As another example, the status of an outstanding issue or unresolved issue is also a factor to be considered by resource analyzer 134. If the status indicates that the help-desk resource 150 is unable to resolve a particular type of issue, then assigning another issue of the same type may not be productive. The issue should therefore be assigned to a different help-desk resource 150. In the same manner, if a help-desk resource 150 has high priority or high severity outstanding and/or unresolved issues, then the assignment of an additional help ticket 112 may jeopardize the resolution of the existing high priority or high severity help ticket 112. Therefore, an additional help tick 112 would not be assigned.

According to an embodiment of the present invention, the availability factors discussed above are combined to determine the help-desk resource 150 with the highest weighted score for a particular help ticket 112. In an embodiment, a high availability score indicates that a particular help-desk resource 150 is the best resource that should be assigned to a particular help ticket 112. Various exemplary factors that may be considered, and weighted, are now described. For example, the vacation status of help-desk resource 150 may be given a significantly negative value if the help-desk resource 150 is on vacation. If the help-desk resource 150 is not on vacation, the vacation status may be given a neutral value. A workload level of help-desk resource 150 may be given a negative value if the help-desk resource 150 has a high workload, while a light workload may result in a neutral value, and a low workload may generate a positive value. If the help-desk resource 150 has had previous personal contact with a particular end-user 102 submitting the digital help request 104, then a positive value may be generated. The quantity of outstanding assigned help tickets 112 to a help-desk resource 150 may be given a negative value if the help-desk resource 150 has a high number of outstanding assigned help tickets 112. If the help-desk resource 150 has a high level of expertise in the area of field of a request, then a positive value may be assigned; conversely, if the help-desk resource 150 has no ability or expertise in the field of a request, a negative value may be assigned. The state of the help-desk resource 150 instant messaging status may generate a negative value if the help-desk resource 150 indicates an away/busy status, a neutral value if a chat status is indicated, and a positive value if an idle status is shown. A high volume of unanswered e-mail from a help-desk resource 150 may be given a negative value. Also, unresolved issues by a help-desk resource 150 may generate a negative value. However, if an unresolved issue is in the process of being resolved, a neutral value may be assigned. The more severe an outstanding or unresolved issue, the more negative the assigned value may be. In addition, the higher priority of an outstanding or unresolved issue, the more negative the assigned value may be. One or more of these values or objects may be combined to give an overall score to a particular help-desk resource 150. The score assigned to a particular help-desk resource 150 may then be used as a factor in determining whether the help-desk resource 150 is suitable for a given help ticket 112.

According to an embodiment of the present invention, help ticket assignment module 110 receives the digital help request characteristics determined by request analyzer module 120 as previously discussed. Help ticket assignment module 110 also receives the suitability and availability factors of help-desk resources 150 determined by task load monitor module 130 as analyzed by resource analyzer 134. If appropriate, help ticket assignment module 110 generates help ticket 112 for a specific help-desk resource 150 corresponding to the submitted digital help request 104. In this embodiment there are multiple help-desk resources as shown by 150A through 150N in FIG. 1. Each help-desk resource 150 has an associated queue 140 of assigned digital help requests. It is also possible that certain assigned help tickets could be transferred between different help-desk resource queues 140 as task load monitor module 130 may determine to be more appropriate, for example when a specific help-desk resource 150 is temporarily not available.

In an embodiment, help ticket assignment module 110 estimates the length of time before an assigned help-desk resource 150 will be able to respond to a help ticket 112 generated in response to a digital help request 104.

In another embodiment, help-desk resource 150 may include help-desk autoresponder 152 which is configured to generate a preset response to digital help request 104. As an example, if resource analyzer 134 determines that digital help request 104 is inappropriate, then help-desk autoresponder 152 generates and sends an email to end-user 102 suggesting that submitted digital help request 104 be directed elsewhere. Help-desk autoresponder 152 may also be configured to automatically delete a digital help request 104 which is determined, with a high level of certainty, to be spam.

Figure 2:
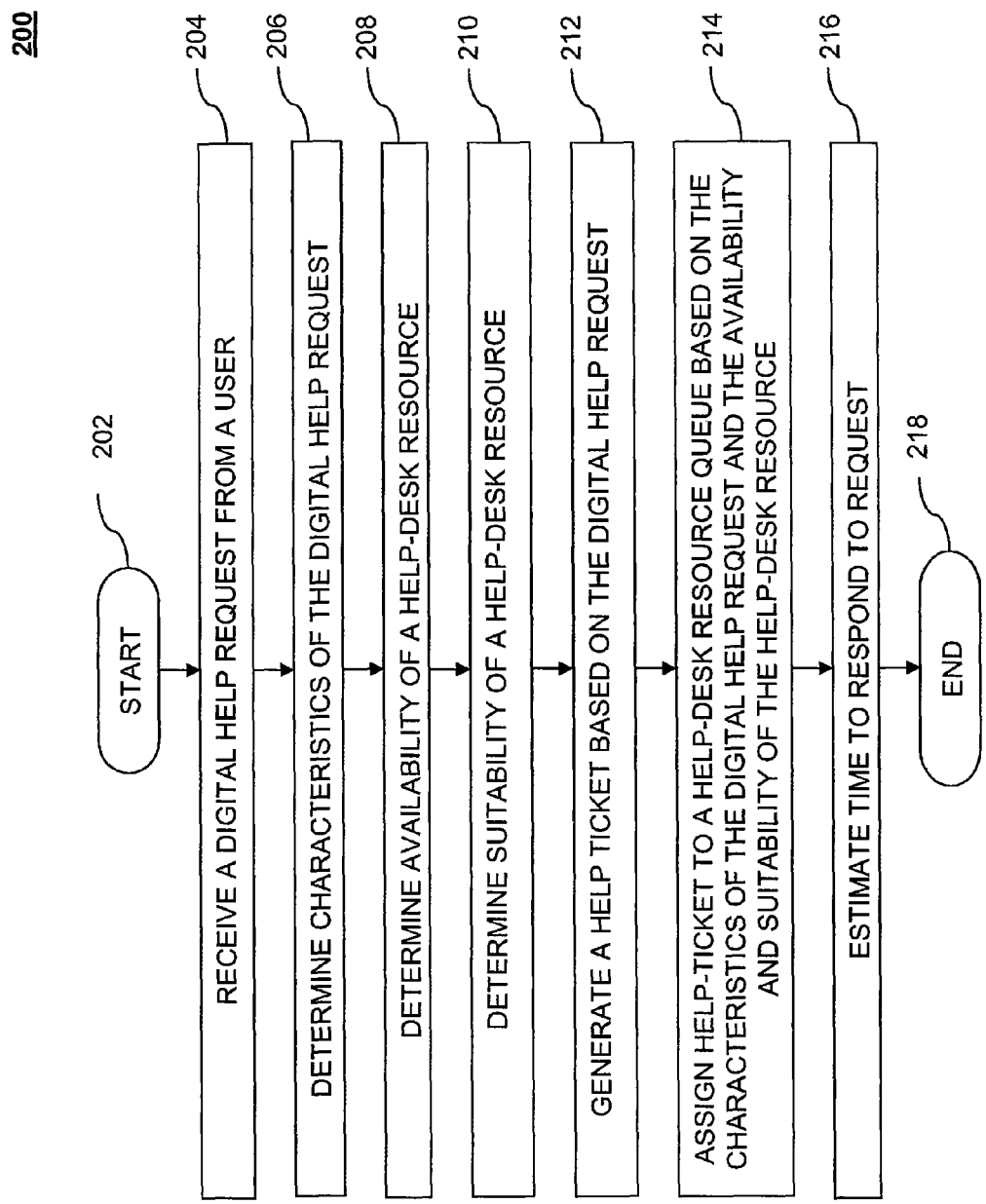
FIG. 2 is a flowchart depicting a method for the automated assignment of help tickets, according to an embodiment of the invention.

FIG. 2 is a flowchart depicting a method 200 for the assignment of help tickets to help-desk resources, according to an embodiment of the present invention. Method 200 begins at step 202. In step 204, a digital help request is received from an end-user. In step 206, characteristics of the digital help request are determined. These characteristics can include, for example, the identity of the user, one or more topics within the request, the relevancy of the request, the likelihood the request is spam, the urgency of the request, and the priority of the request. In step 208 the availability of a help-desk resource is determined. Availability may be determined based on a number of factors, for example, workload level, instant messaging status, volume of unanswered electronic mail, quantity of outstanding assigned tickets, vacation responder, status of an outstanding issue, status of an unresolved issue, severity of the outstanding and unresolved issues, and priority of the outstanding and unresolved issues.

The method continues in step 210 where the suitability of the help-desk resource is determined using a variety of factors. These factors can include, for example, historical information such as the amount of time in which the help-desk resource took to respond to a previous digital help request and a measure of the quality of a previous response of the help-desk resource to a digital help request. In step 212 a help ticket is generated based on the digital help request. In step 214 the help ticket is assigned to a help-desk resource's queue based on the characteristics of the digital help request and the availability and suitability of the help-desk resource. In step 216, the system estimates a time to respond to the digital help request. The method concludes at step 218.

The systems and methods of FIGS. 1 and 2 can be implemented in software, firmware, or hardware, or using any combination thereof. If programmable logic is used, such logic can execute on a commercially available processing platform or a special purpose device.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. A help-ticket assignment system, comprising:
    a request analyzer module configured to receive a digital help-desk request for assistance from a user and determine a characteristic of the digital help-desk request;
    a task load monitor module configured to determine availability and suitability of a help-desk resource based on the characteristic of the digital help-desk request; and
    a help-ticket assignment module configured to assign a help-ticket to the help-desk resource based upon the characteristic of the help-desk request, the determined availability and suitability of the help-desk resource, and a priority and a severity of an outstanding and unresolved issue.

2. The help-ticket assignment system of claim 1, wherein the request analyzer module further comprises a request parser which determines the characteristic of the digital help-desk request, said characteristic comprising at least one of:
    an identity of the user;
    a topic;
    a relevancy;
    a likelihood of spam;
    an urgency; or
    a priority.

3. The help-ticket assignment system of claim 2, wherein the request parser determines one or more topic attributes for each topic, said topic attributes comprising at least one of:
    a keyword contained in the digital help-desk request;
    a distribution of keywords contained in the digital help-desk request;
    an appearance of a common phrase contained in the digital help-desk request; or
    a topic from the user from a previous digital help-desk request,
    wherein the request parser generates a topic score indicating the likelihood associated with each topic.

4. The help-ticket assignment system of claim 2, wherein the characteristic of the digital help-desk request is stored in a request database.

5. The help-ticket assignment system of claim 1, wherein the task load monitor module further comprises:
   a resource analyzer; and
   a resource database,
   wherein the resource database stores help-desk resource data and the resource analyzer determines the availability and suitability of the help-desk resource based on said help-desk resource data stored in the resource database.

6. The help-ticket assignment system of claim 5, wherein help-desk resource data pertaining to suitability comprise at least one of:
   an amount of time in which the help-desk resource took to respond to a previous digital help-desk request; or
   a measure of the quality of the previous response of the help-desk resource to a previous digital help-desk request.

7. The help-ticket assignment system of claim 5, wherein help-desk resource data pertaining to availability comprise at least one of:
   a workload level;
   a state of instant messaging status;
   a volume of unanswered electronic mail;
   a quantity of outstanding assigned tickets;
   a vacation responder;
   a status of an outstanding issue; or
   a status of an unresolved issue.

8. The help-ticket assignment system of claim 1, wherein the help-ticket assignment module estimates a time to respond to the digital help-desk request.

9. The help-ticket assignment system of claim 1, wherein the help-ticket resource includes an autoresponder.

10. A method for help-ticket assignment comprising:
    electronically receiving a digital help-desk request for assistance;
    determining a characteristic and a topic attribute of the digital help-desk request using a request parser;
    determining availability and suitability of a help-desk resource using a resource analyzer; and
    generating an assignment of a help-ticket to the help-desk resource based upon the characteristic and the topic attribute of the help-desk request, the determined availability and suitability of the help-desk resource, and a priority and a severity of an outstanding and unresolved issue.

11. The method of claim 10, wherein the determined characteristic of the digital help-desk request comprise at least one of:
    an identity of the user;
    a topic;
    a relevancy;
    a likelihood of spam;
    an urgency; or
    a priority.

12. The method of claim 11, further comprises generating a topic score for each topic, indicating the likelihood associated with each topic, from the topic attribute, said topic attribute comprising at least one of:
    a keyword contained in the digital help-desk request;
    a distribution of keywords contained in the digital help-desk request;
    an appearance of a common phrase contained in the digital help-desk request; or
    a topic from the user from a previous digital help-desk request.

13. The method of claim 10, wherein determining suitability is based on factors comprising:
    an amount of time in which the help-desk resource took to respond to a previous digital help-desk request;
    a measure of the quality of the previous response of the help-desk resource to a previous digital help-desk request.

14. The method of claim 10, wherein determining availability is based on factors comprising at least one of:
    a workload level;
    a state of instant messaging status;
    a volume of unanswered electronic mail;
    a quantity of outstanding assigned tickets;
    a vacation responder;
    a status of an outstanding issue; or
    a status of an unresolved issue.

15. The method of claim 10, further comprising an estimating of time to respond to the digital help-desk request.

16. An apparatus for assigning help-tickets, comprising:
    a processor;
       a network communication interface; and
       a memory in communication with the processor, the memory being configured to store a plurality of processing instructions directing the processor,
    in conjunction with the network communication interface, to:
       receive a digital help-desk request for assistance;
       determine a characteristic of the digital help-desk request;
       determine availability and suitability of a help-desk resource; and
       assign a help-ticket to the help-desk resource based upon the characteristic of the help-desk request, the determined availability and suitability of the help-desk resource, and a priority and a severity of an outstanding and unresolved issue.

17. A computer program product comprising a computer readable medium having control logic stored thereon for causing a computer to assign help-tickets, comprising:
    first computer readable program code that causes the computer to receive a digital help-desk request for assistance;
    second computer readable program code that causes the computer to determine a characteristic of the digital help-desk request;
    third computer readable program code that causes the computer to determine suitability of a help-desk resource;
    fourth computer readable program code that causes the computer to determine availability of a help-desk resource; and
    fifth computer readable program code that causes the computer to assign a help-ticket to the help-desk resource based upon the characteristic of the help-desk request, the determined availability and suitability of the help-desk resource, and a priority and a severity of an outstanding and unresolved issue.

18. The computer program product of claim 17, wherein the second computer readable program code that causes the computer to determine the characteristic of the digital help-desk request comprise at least one of:
    an identity of the user
    a topic;
    a relevancy;
    a likelihood of spam; or
    an urgency.

19. The computer program product of claim 17, further comprising sixth computer readable program code that causes the computer to generate a topic score for one or more topics, indicating the likelihood associated with each topic, from topic attributes, said topic attributes comprising at least one of:

a keyword contained in the digital help-desk request;

a distribution of keywords contained in the help-desk request;

an appearance of a common phrase contained in the digital help-desk request; or a topic from the user from a previous digital help-desk request.

20. The computer program product of claim 17, wherein the third computer readable program code that causes the computer to determine suitability of a help-desk resource comprise at least one of:

an amount of time in which the help-desk resource took to respond to a previous digital help-desk request; or a measure of the quality of the previous response of the help-desk resource to a previous digital help-desk request.

21. The computer program product of claim 17, wherein the fourth computer readable program code that causes the computer to determine availability of a help-desk resource comprise at least one of:

a workload level;

a state of instant messaging status;

a volume of unanswered electronic mail;

a quantity of outstanding assigned tickets; and a vacation responder;

a status of an outstanding issue; or a status of an unresolved issue.

22. The computer program product of claim 17, further comprising a seventh computer readable program code that causes the computer to estimate a time to respond to the digital help-desk request.

\* \* \* \* \*

UNITED STATES PATENT AND TRADEMARK OFFICE
CERTIFICATE OF CORRECTION

PATENT NO.       : 8,135,612 B1
APPLICATION NO.  : 12/347687
DATED            : March 13, 2012
INVENTOR(S)      : Jeffrey William Scudder It is certified that error appears in the above-identified patent and that said Letters Patent is hereby corrected as shown below:

Column 9
Line 49, Claim 11, please replace "comprise" with --comprises--.

Column 9
Line 57, Claim 12, please replace "comprises" with --comprising--.

Signed and Sealed this
Thirty-first Day of July, 2012

David J. Kappos
*Director of the United States Patent and Trademark Office*